United States Patent
Ward

(10) Patent No.: US 10,625,135 B2
(45) Date of Patent: Apr. 21, 2020

(54) AUTOMATIC BALL LAUNCHER

(71) Applicant: Radio Systems Corporation, Knoxville, TN (US)

(72) Inventor: Eric A. Ward, Knoxville, TN (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 0 days.

(21) Appl. No.: 16/373,298

(22) Filed: Apr. 2, 2019

(65) Prior Publication Data

US 2019/0224555 A1 Jul. 25, 2019

Related U.S. Application Data

(63) Continuation-in-part of application No. 29/561,099, filed on Apr. 13, 2016, now Pat. No. Des. 848,082, which is a continuation-in-part of application No. 14/562,671, filed on Dec. 6, 2014, now Pat. No. 9,339,716.

(51) Int. Cl.
*A63B 69/40* (2006.01)
*A01K 15/02* (2006.01)

(52) U.S. Cl.
CPC .......... *A63B 69/408* (2013.01); *A01K 15/025* (2013.01); *A01K 15/027* (2013.01); *A63B 2208/14* (2013.01)

(58) Field of Classification Search
CPC ... A63B 65/12; A63B 69/407; A63B 2208/14; A01K 15/02
USPC ...................... 124/7, 16, 32, 54, 78; 119/707
See application file for complete search history.

(56) References Cited

U.S. PATENT DOCUMENTS

| | | | |
|---|---|---|---|
| 1,534,964 A | | 4/1925 | Kahnweiler |
| 3,400,703 A | * | 9/1968 | Rhodes ................ A63B 69/409 124/75 |
| 3,511,225 A | * | 5/1970 | Yokoi .................. A63B 69/408 124/7 |
| 3,611,996 A | | 10/1971 | Wegner |
| 3,640,263 A | | 2/1972 | Rhodes |
| 3,665,892 A | | 5/1972 | Kusisto |

(Continued)

FOREIGN PATENT DOCUMENTS

| | | |
|---|---|---|
| CA | 2920549 A1 | 8/2016 |
| CN | 201234507 Y | 5/2009 |

(Continued)

OTHER PUBLICATIONS

Australian Patent Examiner's First Report on Patent Apptication No. 2009305576 dated Jul. 26, 2013, 3 pages.

(Continued)

*Primary Examiner* — Alexander R Niconovich
(74) *Attorney, Agent, or Firm* — Baker, Donelson, Bearman, Caldwell & Berkowitz PC

(57) ABSTRACT

A ball launching apparatus is provided. The apparatus includes a funnel residing at an upper end of a housing. The funnel includes a channel for gravitationally directing a ball into a launch point within an interior compartment of the housing. The apparatus includes a hammer that strikes a ball through a chute, thereby releasing the ball from the housing. Both the distance at which the ball travels and the angle at which the ball leaves the chute may be adjusted by the operator. A method of exercising a dog is also provided herein.

1 Claim, 5 Drawing Sheets

(56) References Cited

U.S. PATENT DOCUMENTS

| | | | |
|---|---|---|---|
| 3,913,552 A | 10/1975 | Yarur et al. | |
| 4,094,294 A * | 6/1978 | Speer | A63B 69/409 124/44.7 |
| 4,168,695 A * | 9/1979 | Haller | A63B 69/408 124/16 |
| 4,185,608 A * | 1/1980 | Young | A63F 7/2472 124/16 |
| 4,209,003 A * | 6/1980 | Sainsbury | A63B 69/408 124/41.1 |
| 4,237,851 A * | 12/1980 | Haller | A63B 69/408 124/16 |
| 4,267,799 A * | 5/1981 | Bacon | A01K 5/0275 119/61.2 |
| 4,323,047 A | 4/1982 | McIntosh et al. | |
| 4,368,885 A | 1/1983 | Katada et al. | |
| 4,409,953 A * | 10/1983 | Kennedy | A63B 69/408 124/36 |
| 4,534,316 A | 8/1985 | Bowlsby | |
| 4,579,100 A * | 4/1986 | Whitaker | A63B 69/407 124/26 |
| 4,579,340 A * | 4/1986 | Jenkins | A63B 63/083 124/3 |
| 4,583,514 A * | 4/1986 | Nozato | A63B 69/406 124/78 |
| 4,721,091 A * | 1/1988 | Ridley | A63B 69/408 124/16 |
| 4,722,299 A | 2/1988 | Mohr | |
| 4,803,953 A | 2/1989 | Graves et al. | |
| 4,834,060 A * | 5/1989 | Greene | A63B 69/406 124/78 |
| 4,907,540 A | 3/1990 | Reynolds | |
| 4,926,796 A | 5/1990 | Leopold | |
| 4,930,448 A | 6/1990 | Robinson | |
| 4,940,018 A | 7/1990 | Edling | |
| 4,995,374 A * | 2/1991 | Black | A01K 15/025 124/32 |
| 5,103,770 A | 4/1992 | Berkovich | |
| 5,111,771 A | 5/1992 | Mathews | |
| D335,553 S | 5/1993 | Conner | |
| D336,033 S | 6/1993 | Welsh | |
| 5,265,583 A * | 11/1993 | Otto | A63B 69/40 124/26 |
| 5,269,261 A | 12/1993 | McCance | |
| D345,633 S | 3/1994 | McCance | |
| 5,390,629 A | 2/1995 | Simone | |
| 5,413,085 A | 5/1995 | Kraeft | |
| 5,443,036 A | 8/1995 | Amiss et al. | |
| 5,517,948 A | 5/1996 | Udelle et al. | |
| 5,529,017 A | 6/1996 | Udelle et al. | |
| 5,540,187 A | 7/1996 | Udelle et al. | |
| 5,572,955 A | 11/1996 | Boshears | |
| 5,575,482 A * | 11/1996 | Butler, Jr. | A63B 69/407 124/17 |
| 5,579,725 A | 12/1996 | Boshears et al. | |
| 5,592,901 A | 1/1997 | Birmingham | |
| 5,619,953 A | 4/1997 | Griffin | |
| 5,634,435 A | 6/1997 | Udelle et al. | |
| 5,657,721 A | 8/1997 | Mayfield et al. | |
| 5,749,797 A * | 5/1998 | Sunseri | A63B 69/407 124/16 |
| 5,775,263 A | 7/1998 | Richards | |
| 5,806,465 A | 9/1998 | Baiera et al. | |
| 5,857,451 A * | 1/1999 | Ciluffo | A63B 69/0026 124/6 |
| D405,563 S | 2/1999 | Baiera | |
| 5,875,736 A | 3/1999 | Udelle et al. | |
| 5,881,679 A | 3/1999 | Hann | |
| 5,934,223 A | 8/1999 | Ellery-Guy | |
| D414,903 S | 10/1999 | Baiera | |
| 6,058,887 A | 5/2000 | Silverman | |
| D427,260 S | 6/2000 | Burr | |
| 6,089,215 A * | 7/2000 | Morris | A63B 69/408 124/16 |
| 6,159,112 A | 12/2000 | Ciluffo et al. | |
| 6,174,216 B1 | 1/2001 | Chianese | |
| 6,176,230 B1 * | 1/2001 | Thompson | A63B 69/407 124/16 |
| 6,190,271 B1 * | 2/2001 | Rappaport | A63B 69/0002 124/78 |
| 6,343,569 B1 | 2/2002 | Buendiger | |
| 6,353,168 B1 | 3/2002 | Sosoka, Jr. et al. | |
| 6,360,694 B1 | 3/2002 | Noto | |
| 6,459,955 B1 | 10/2002 | Bartsch et al. | |
| 6,505,576 B2 | 1/2003 | Nathanson et al. | |
| 6,510,817 B2 | 1/2003 | Horvath | |
| 6,514,162 B1 * | 2/2003 | Karellas | A63B 47/002 124/16 |
| 6,550,426 B2 | 4/2003 | Tsengas | |
| 6,557,495 B2 | 5/2003 | Lorenz | |
| 6,568,353 B2 | 5/2003 | Van Sluis | |
| 6,571,742 B1 | 6/2003 | Tsengas | |
| 6,571,743 B1 * | 6/2003 | Curry | A01K 15/02 119/712 |
| 6,591,785 B1 | 7/2003 | Boshears et al. | |
| 6,640,750 B2 | 11/2003 | Rowe et al. | |
| 6,651,591 B1 | 11/2003 | Chelen | |
| 6,679,239 B1 * | 1/2004 | Shultz | A63B 69/408 124/16 |
| 6,701,872 B1 | 3/2004 | Allen | |
| 6,732,724 B1 * | 5/2004 | Paulson | A63B 69/406 124/6 |
| 6,772,745 B2 * | 8/2004 | McEachen | A63B 69/406 124/51.1 |
| 6,817,351 B2 * | 11/2004 | Keller | F41B 3/04 124/6 |
| 6,843,241 B1 * | 1/2005 | Newcomer | A63B 69/407 124/16 |
| 6,875,136 B2 * | 4/2005 | Leal | A63B 69/0002 124/16 |
| 6,880,542 B1 * | 4/2005 | Johndreau | A63B 69/406 124/78 |
| 6,892,675 B1 | 5/2005 | Comerford | |
| 7,044,084 B2 | 5/2006 | Ritchey | |
| 7,066,780 B2 | 6/2006 | Jamison et al. | |
| 7,111,620 B2 * | 9/2006 | Johndreau | A63B 69/406 124/51.1 |
| 7,114,465 B1 * | 10/2006 | Winter | A63B 65/12 119/707 |
| 7,237,546 B2 * | 7/2007 | Nozato | A63B 69/406 124/78 |
| 7,263,953 B2 | 9/2007 | Krishnamurthy et al. | |
| 7,278,934 B2 * | 10/2007 | McBride | A63B 63/00 124/78 |
| 7,328,671 B2 | 2/2008 | Kates | |
| 7,334,541 B2 * | 2/2008 | Reiter | A01K 15/02 119/712 |
| 7,350,515 B2 * | 4/2008 | Yao | A63B 47/002 124/49 |
| 7,445,003 B2 * | 11/2008 | Smith | A63B 69/406 124/78 |
| 7,520,818 B2 | 4/2009 | Winchester | |
| 7,631,617 B1 | 12/2009 | Tsengas et al. | |
| 7,691,012 B2 | 4/2010 | Cucjen et al. | |
| 7,704,119 B2 | 4/2010 | Evans | |
| 7,712,909 B2 | 5/2010 | Nobayashi | |
| 7,762,213 B2 | 7/2010 | Cook et al. | |
| 7,766,770 B2 | 8/2010 | Cucjen et al. | |
| 7,806,087 B2 | 10/2010 | Plante | |
| 7,823,571 B2 | 11/2010 | Williamson et al. | |
| 7,823,574 B2 | 11/2010 | Chu | |
| 7,977,230 B2 | 7/2011 | Appel | |
| 7,997,230 B2 | 8/2011 | Cook et al. | |
| 8,011,326 B2 | 9/2011 | Del Pinal et al. | |
| D646,443 S | 10/2011 | Cook et al. | |
| 8,028,659 B2 | 10/2011 | Cook et al. | |
| 8,074,633 B2 * | 12/2011 | Grant | A63B 69/406 124/78 |
| 8,104,458 B2 | 1/2012 | Hoffman | |
| 8,109,239 B1 | 2/2012 | Smestad et al. | |
| D656,282 S | 3/2012 | Dixon et al. | |

(56) References Cited

U.S. PATENT DOCUMENTS

| | | | |
|---|---|---|---|
| 8,161,908 B2 | 4/2012 | Cook et al. | |
| D659,305 S | 5/2012 | Song et al. | |
| D659,915 S | 5/2012 | Letchford | |
| 8,166,918 B2 | 5/2012 | Cook et al. | |
| 8,166,919 B2 | 5/2012 | Cook et al. | |
| 8,166,920 B2 | 5/2012 | Cook et al. | |
| 8,225,750 B2* | 7/2012 | Newman | A01K 15/025 119/51.01 |
| 8,287,404 B2 | 10/2012 | Cucjen et al. | |
| 8,328,368 B2 | 12/2012 | Luciano | |
| 8,347,823 B1 | 1/2013 | Thomas et al. | |
| 8,371,249 B1 | 2/2013 | Little | |
| 8,393,299 B1 | 3/2013 | Bernat | |
| 8,393,300 B2 | 3/2013 | Markham et al. | |
| 8,414,350 B2 | 4/2013 | Rehkemper et al. | |
| 8,418,681 B2 | 4/2013 | Levin et al. | |
| 8,517,003 B2 | 8/2013 | Fisher | |
| 8,522,725 B1* | 9/2013 | Moore | A01K 15/02 119/707 |
| 8,550,063 B2* | 10/2013 | Alger | A63B 69/406 124/6 |
| 8,640,653 B2 | 2/2014 | Cook et al. | |
| 8,789,986 B2 | 7/2014 | Li | |
| 8,807,089 B2* | 8/2014 | Brown | A01K 1/0107 119/712 |
| 8,893,698 B2* | 11/2014 | Boehner | A63B 69/406 124/78 |
| 8,926,137 B2 | 1/2015 | Li | |
| 8,932,156 B2* | 1/2015 | Boehner | A63B 69/406 124/78 |
| 8,944,006 B2* | 2/2015 | Anderson | A01K 5/01 119/51.01 |
| 8,944,011 B2 | 2/2015 | Kirschbaum | |
| D724,795 S | 3/2015 | Cook et al. | |
| 9,022,016 B1* | 5/2015 | Hafer | F41B 4/00 124/6 |
| D748,349 S | 1/2016 | Hussey et al. | |
| 9,301,503 B1* | 4/2016 | Arrighi | A01K 15/025 |
| 9,320,960 B1* | 4/2016 | Ward | A01K 15/02 |
| 9,371,973 B2 | 6/2016 | Li | |
| D794,878 S | 8/2017 | Hussey et al. | |
| 9,730,428 B1 | 8/2017 | Kreischer et al. | |
| D797,385 S | 9/2017 | Hamill et al. | |
| 9,943,070 B1 | 4/2018 | Allen et al. | |
| 10,028,488 B2* | 7/2018 | Hsu | A01K 15/027 |
| 10,117,419 B2* | 11/2018 | Hamill | A01K 15/025 |
| 2001/0003942 A1 | 6/2001 | Yabushita et al. | |
| 2001/0037773 A1 | 11/2001 | Nathanson et al. | |
| 2002/0002955 A1 | 1/2002 | Lorenz | |
| 2003/0150398 A1 | 8/2003 | Nathanson et al. | |
| 2005/0056033 A1 | 3/2005 | Gingras | |
| 2005/0224003 A1 | 10/2005 | Yin et al. | |
| 2006/0150918 A1 | 7/2006 | Rowe | |
| 2006/0213453 A1* | 9/2006 | Conrady | A01K 15/025 119/707 |
| 2006/0219187 A1* | 10/2006 | Krishnamurthy | A01K 5/0275 119/719 |
| 2007/0289550 A1 | 12/2007 | Huang | |
| 2008/0011243 A1 | 1/2008 | Moulton | |
| 2008/0236511 A1 | 10/2008 | Boelke et al. | |
| 2010/0079999 A1 | 4/2010 | Schnuckle | |
| 2010/0089329 A1 | 4/2010 | Lefferson et al. | |
| 2011/0265728 A1 | 11/2011 | Cook et al. | |
| 2011/0303208 A1* | 12/2011 | Taylor | A01K 15/02 124/54 |
| 2012/0097114 A1 | 4/2012 | Scott | |
| 2012/0134157 A1 | 5/2012 | Li | |
| 2012/0234258 A1 | 9/2012 | Cook et al. | |
| 2012/0298049 A1 | 11/2012 | Cook et al. | |
| 2013/0081577 A1 | 4/2013 | Morris | |
| 2013/0228138 A1* | 9/2013 | Hamill | A01K 15/025 119/707 |
| 2014/0283757 A1 | 9/2014 | Davison, III et al. | |
| 2015/0036348 A1 | 2/2015 | Dong et al. | |
| 2015/0321059 A1 | 11/2015 | Hussey et al. | |
| 2016/0242388 A1 | 8/2016 | Chiou et al. | |
| 2017/0326428 A1* | 11/2017 | Qian | A01K 15/025 |

FOREIGN PATENT DOCUMENTS

| | | |
|---|---|---|
| CN | 303650345 | 4/2016 |
| EM | 002594101-0001 | 1/2015 |
| JP | 2002176873 A | 6/2002 |
| KR | 20130027393 A | 3/2013 |
| KR | 20140092530 A | 7/2014 |

OTHER PUBLICATIONS

Co-pending Design U.S. Appl. No. 29/523,407, filed Apr. 19, 2015, 20 pages.

English Translation for Japanese office action Application No. JP2011532303, transmission dated Feb. 4, 2014, 5 pages.

Extended European Search Report for Application No. EP15866103 dated May 11, 2018, 8 pages.

Fetch-N-Treat website, http://tug-e-nuff.co.uk/fetch-n-treat.html, accessed on Feb. 29, 2016, 2 pages.

GoDogGo website, www.godoggoinc.com/products/godog-gofetchmachine.html, accessed on Feb. 29, 2016, 4 pages.

IFetch Shop website, http://shop.goifetch.com/product-p/ifetch-too.htm, accessed on Feb. 29, 2016, 4 pages.

International Preliminary Report on Patentability for Application No. PCT/US2015/061296 dated Jun. 6, 2017, 8 pages.

International Search Report and Written Opinion for Application No. PCT/US2015/061296 dated Feb. 29, 2016, 10 pages.

International Search Report and Written Opinion for Application No. PCT/US2018/044698 dated Sep. 26, 2018, 8 pages.

On-line Product available from www.amazon.com called Ethical Pet Mouse Chase Electronic Cat Toy, printed Jun. 15, 2014, 5 pages.

PetSafe, http://www.petsafe.net/, accessed on Mar. 22, 2016, 2 pages.

Pounce Cat Toy, petsafe.net, accessed on Aug. 28, 2015, 1 page.

Web page from www.frolicat.com for "Bolt" toy printed May 13, 2013, 3 pages.

Web page from www.frolicat.com for "Dart" toy printed May 13, 2013, 3 pages.

Web page from www.frolicat.com for "Sway" toy printed May 13, 2013, 3 pages.

Web page from www.frolicat.com for "Twitch" toy printed May 13, 2013, 3 pages.

Website for http://goifetch.com, printed Oct. 13, 2014, published Jan. 1, 2013, 1 page.

Website for www.godoggoinc.com, printed Oct. 13, 2014, published Jan. 1, 2008, 3 pages.

Youtube, https://www.youtube.com/watch?v=RiodBs283-E, posted on Apr. 27, 2016, 1 page.

\* cited by examiner

AUTOMATIC BALL LAUNCHER

RELATED APPLICATIONS

This application is a continuation in part application of U.S. application Ser. No. 29/561,099, filed Apr. 13, 2016, which is a continuation in part application of U.S. application Ser. No. 14/562,671, filed Dec. 6, 2014.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present inventive concept relates to the field of animal exercising devices. More particularly, the invention relates to a device that launches a ball (such as a tennis ball), and that has an open top which allows the dog to return the ball and re-load it into the ball launching device, whereupon the ball is re-launched automatically.

Technology in the Field of the Invention

It is desirable by pet owners to provide exercise and entertainment for their canine pets. One common way of doing this is to throw an object such as a stick or a ball, and then train the dog to retrieve the object.

Several devices have been developed which enable a pet owner to interact with a dog by using a ball launching device. One category of ball launching devices is the manual ball launcher. U.S. Pat. No. 8,418,681 entitled "Ball Thrower" and U.S. Pat. No. 7,823,571 entitled "Dog Exercising Apparatus and Method" present examples of hand-operated ball launchers. These devices generally require the pet owner to handle the ball, load the ball into the launcher, and then sling the launcher in order to eject the ball.

Another category of ball launching devices is the solenoid, or "firing ram" launcher. U.S. Pat. No. 6,571,743 entitled "Remote Control Ball Ejector" provides an example of such a launcher. This launcher is electrically powered and remotely controlled to actuate linear movement of a striking arm, thereby causing the ejection of a ball from a housing.

U.S. Pat. No. 6,176,230 uses closely-related technology for launching a ball in the form of a so-called hammer. The '230 patent is entitled "Portable Projectile Launcher for Pet Amusement." The hammer relies upon rotational movement of a striking arm rather than the linear motion used by a firing arm.

The hammer of the '230 patent is marketed under the name GoDogGo® Fetching Machine. The GoDogGo® pet product is promoted as an automatic ball thrower that is designed specifically for dogs "to allow for independent fetch or owner-controlled play [using a] remote control. [The] GoDogGo interactive ball toy is designed with an Automatic Sensor & Safety Switch with Auto Stop Feature so GoDogGo [sic] will NOT run, rotate or launch unless a ball is in the ready position." See http://www.godoggoinc.com/. In actuality, the safety switch of the GoDogGo® product is a gravity switch that is activated when a ball rolls into position; it is not a safety switch for animals or people in the path of the launched ball.

Still another category of ball launching devices is the fly wheel device. Such devices employ a pair of adjacent rotating wheels to hurl an object. Fly wheel launchers are commonly used to throw baseballs and footballs for team or player practice. Recently, fly wheel launchers have been adapted for use in launching tennis balls for dogs. U.S. Pat. Nos. 7,691,012 and 8,287,404 entitled "Programmable Ball Throwing Apparatus" present examples of fly wheel ball throwing devices.

U.S. Patent Publ. No. 2013/0228138 entitled "Pet Exercise and Entertainment Device" offers another ball launching device that uses fly wheels. This device is marketed by Hamill Partners, LLC of Austin, Tex. as the iFtech®. The iFetch® pet product is promoted at http://goifetch.com. The iFetch® product requires motors to drive separate wheels (described in the application as wheels 226) at high speed, and increased drive power to support the dual motors. Additionally, to keep costs down, the iFetch® pet products are somewhat miniaturized and require specially-purchased miniature tennis balls.

A need exists for an improved automatic ball launcher for a pet that does not rely upon rotating fly wheels. Further, a need exists for a new portable ball launcher that uses a hammer, and which is automatically actuated when a sensor senses the presence of a ball as placed by a human or a dog. Still further, a need exists for an improved ball launching apparatus that allows the operator to adjust both the distance at which a ball is launched, and the angle at which the ball is launched.

BRIEF SUMMARY OF THE INVENTION

A ball launching apparatus is provided herein. In one embodiment, the ball launching apparatus first comprises a housing. The housing serves to contain and at least partially conceal certain mechanized components of the system, including an electrical drive motor. The housing has a supporting base and an interior compartment.

The ball launching apparatus also includes a funnel. The funnel resides at an upper end of the housing. The funnel includes a channel for gravitationally directing a ball into a launch point within the interior compartment. Preferably, a cup is provided below the funnel to secure the received ball at the launch point.

The ball launching apparatus next includes a chute. The chute resides adjacent the launch point. The chute defines a through-opening along the housing through which a ball is launched from the launch point.

The ball launching apparatus further includes a platform. The platform resides within the compartment. Pivot connection points are provided on opposing perimeter sides of the platform to enable the platform to pivot. In one aspect, an angle of the platform relative to the base is adjustable between 20° and 45°. Pivoting the platform adjusts the angle at which the ball is launched through the chute.

The ball launching apparatus additionally comprises a drive motor. The motor is configured to rotate a shaft within the compartment. The shaft, in turn, rotates a ratchet head having teeth.

The ball launching apparatus also has an elongated hammer. The hammer resides along the platform and has a proximal end, a distal end, and a through-opening for freely (substantially non-frictionally) receiving the shaft. The through-opening is at the proximal end of the hammer.

The hammer is configured such that rotation of the drive shaft operatively causes the distal end of the hammer to be rotated away from the launch point. The hammer is biased to rotate a striking surface along the distal end of the hammer back towards the launch point. Preferably, the biasing force is in a clockwise direction.

It is preferred that the biasing force be generated by a spring. The spring resides along the platform and is maintained in tension to provide the biasing force. The spring has a first end that is secured to the platform, and a second end that is operatively connected to a proximal end of the hammer through a pin. Rotation of the shaft applies increased tension to the spring to create the biasing force.

The ball launching apparatus next includes a switch. The switch is configured to sense the presence of a ball in the launching point, and then send a signal to initiate rotation of the shaft. In one aspect, the switch initiates operation of the drive motor for a cycle of between 5 and 10 seconds.

In one aspect, the ball launching apparatus also comprises a trigger release arm. The trigger release arm has a proximal end and a distal end. The trigger release arm is pivotally secured to the platform, while the distal end includes a hook or pawl that is configured to engage a tooth of the ratchet head. As the drive shaft and connected ratchet head rotate in response to actuation of the drive motor, a tooth of the ratchet head temporarily engages a pawl at the distal end of the trigger release arm. This serves to increase tension held in the spring, thereby loading the biasing force at the proximal end of the hammer.

In one aspect, a separate tooth in the ratchet head also engages the hammer proximate the shaft, causing rotation of the hammer. In a more preferred embodiment, a flange extending from the proximal end of the hammer is connected to the distal end of the trigger release arm, such as through a pin. In either instance, rotation of the ratchet head and connected hammer reciprocally induces counter-rotation of the trigger release arm. As the ratchet head rotates and loads the spring, the pawl at the distal end of the trigger release arm is ultimately released from the ratchet tooth. When this occurs, the hammer is rapidly rotated back to a neutral position. En route, the biasing force on the hammer causes a striking surface at the distal end of the hammer to strike the ball and launch the ball through the chute.

In one embodiment, the housing of the ball launching apparatus comprises a raised portion. This raised portion resides along an upper end of the housing, and is positioned on a side of the housing where the chute is. The housing may further include a handle residing along the raised portion.

A method of exercising a dog is also provided herein. In one aspect, the method first includes providing a ball launching apparatus. The ball launching apparatus is configured in accordance with the apparatus described above in its various embodiments.

The method also includes providing a ball to a dog. Preferably, the ball is a standard tennis ball having an outer diameter of between about 2.5 and 2.7 inches. The method then comprises training the dog to place the ball into the funnel. The switch will sense the presence of the ball once it falls into the launch point. The motor is actuated and the hammer strikes the ball, sending it through the chute. The dog may then chase (or "fetch") the ball, and return it to the funnel once again. In this way, the dog is self-entertained and exercised.

The method may optionally include adjusting a tension in the spring, thereby ultimately adjusting the distance in which the ball travels when struck. The method may also optionally include adjusting an angle of the platform relative to the base. This has the effect of changing the angle at which the ball is released from the chute. Preferably, making these adjustments is done by turning or, optionally, sliding adjustment knobs residing external to the housing.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 4A is a front view of the platform of the ball launcher of FIG. 1A. The ball is placed along a launch point on a platform and is in position to be struck by an elongated hammer.

FIG. 4B is a rear perspective view of the platform of the ball launcher of FIG. 4A. The ball is again shown along the launch point on the platform, with the hammer being in position to strike the ball.

FIG. 4C is an enlarged perspective view of a portion of the platform of FIG. 4A. The tension adjustment knob and a connected tension gear and engaged tensional gear track are more clearly seen.

FIG. 4D is an enlarged perspective view of the platform of FIG. 4B. The angle adjustment knob and a connected angle gear and engaged rotational gear track are more clearly seen.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the term "ball" means a spherical object of any size, so long as the outer diameter is suitable for being received and carried in the mouth of a canine pet.

As used herein, the term "pawl" means any hook or portion that extends from an arm to engage a tooth.

Description of Selected Specific Embodiments

Figure 1A:
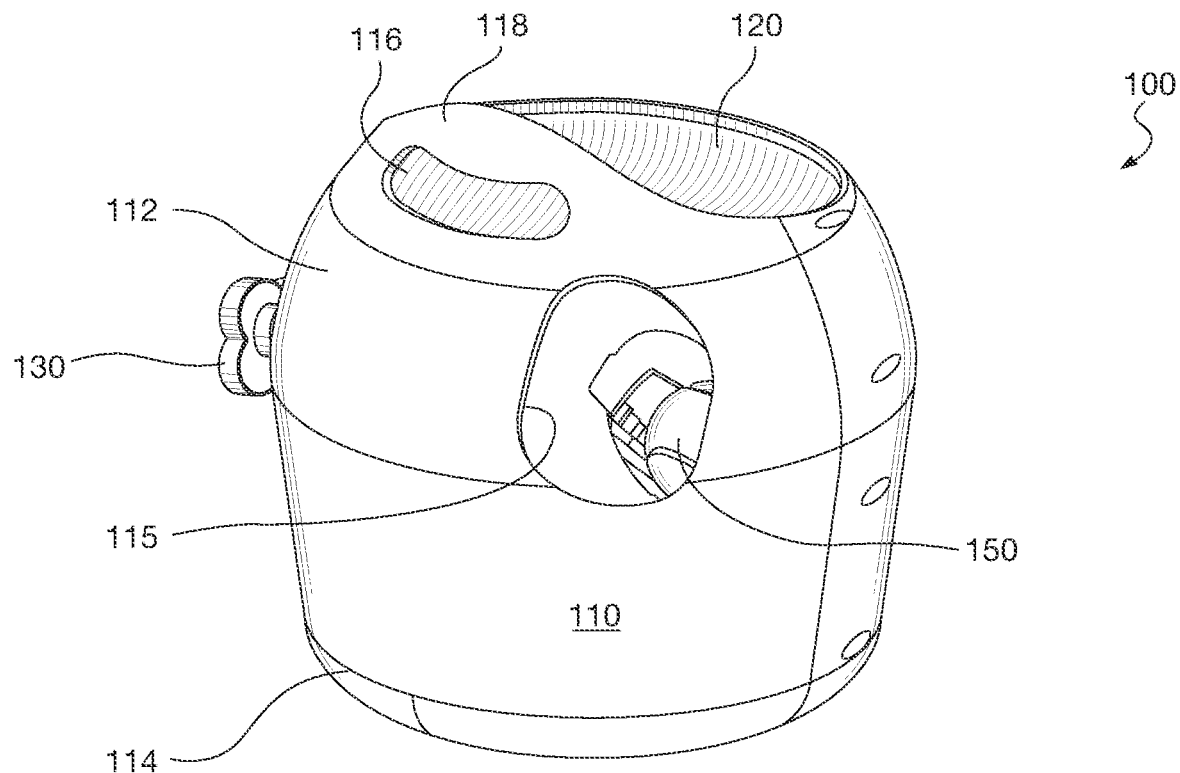
FIG. 1A is a perspective view of an automatic ball launcher of the present invention, in one embodiment. A chute is seen along a housing of the ball launcher.

FIG. 1A is a perspective view of an automatic ball launcher 100 of the present invention, in one embodiment. The ball launcher 100 defines a housing 110 having an upper end 112 and a lower end 114. The upper end 112 supports a handle 116 that is machined into or otherwise attached to an extended upper portion 118 of the housing 110. The handle 116 facilitates lifting and moving of the ball launcher 100. At the same time, the lower end 114 provides a base for supporting the housing 110 and mechanical components once the ball launcher 100 is desirably located.

The automatic ball launcher 100 is designed to serve as an exercising toy for a canine. The launcher 100 allows the canine to retrieve a ball, place the ball into a funnel 120 residing in the upper end 112 of the housing 110, and then wait for a ball 150 to be launched from the housing 110, whereupon the ball 150 may once again be retrieved.

Figure 1B:
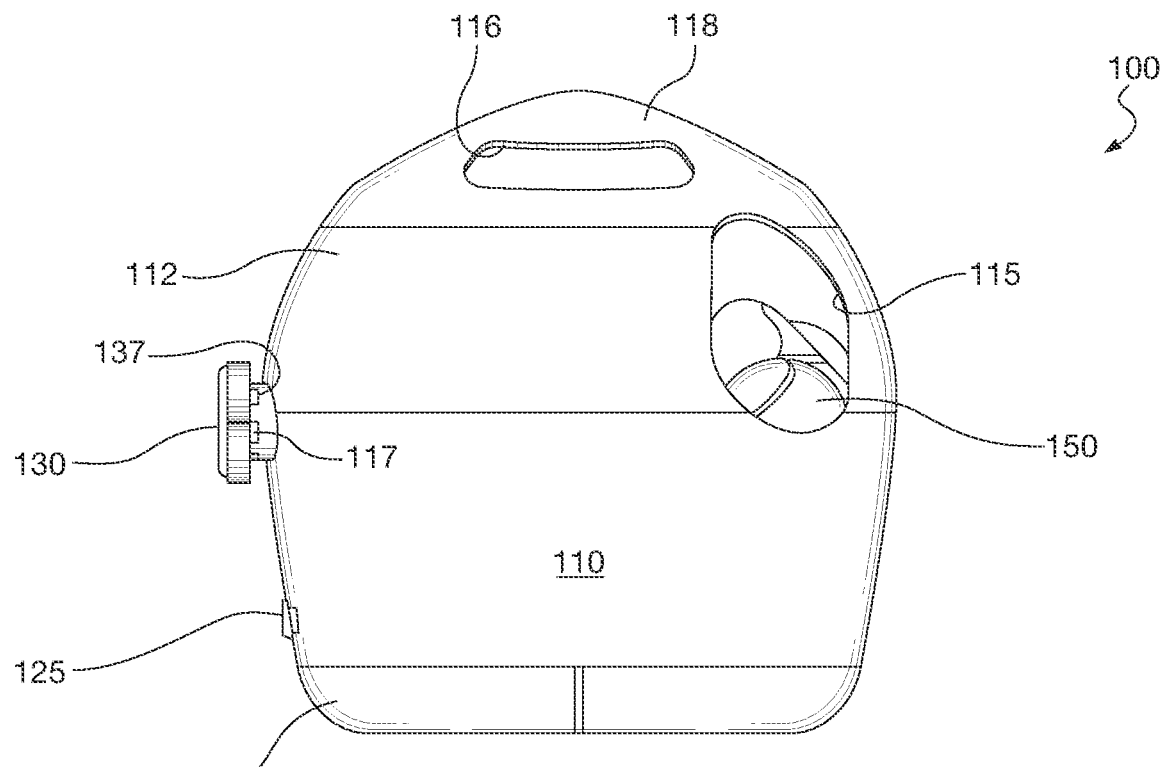
FIG. 1B is a front view of the automatic ball launcher of FIG. 1A. The chute is again seen, with a ball being in position for launching.

The ball launcher 100 is configured to launch the ball 150 from a chute 115. FIG. 1B presents a front elevation view of the ball launcher 100. A ball 150 is partially seen, ready to be launched through the chute 115. In addition, the handle 116 is more clearly seen.

It is preferred that the handle 116 and the upper extended portion of the housing 110 reside at the front of the ball launcher 100. The reason is that the owner wants the dog to retrieve the ball 150 and place it in the funnel 120 from a back side of the housing 110. This prevents the dog (not shown) from being struck by a next ball 150 that is being launched through the chute 115.

Figure 2A:
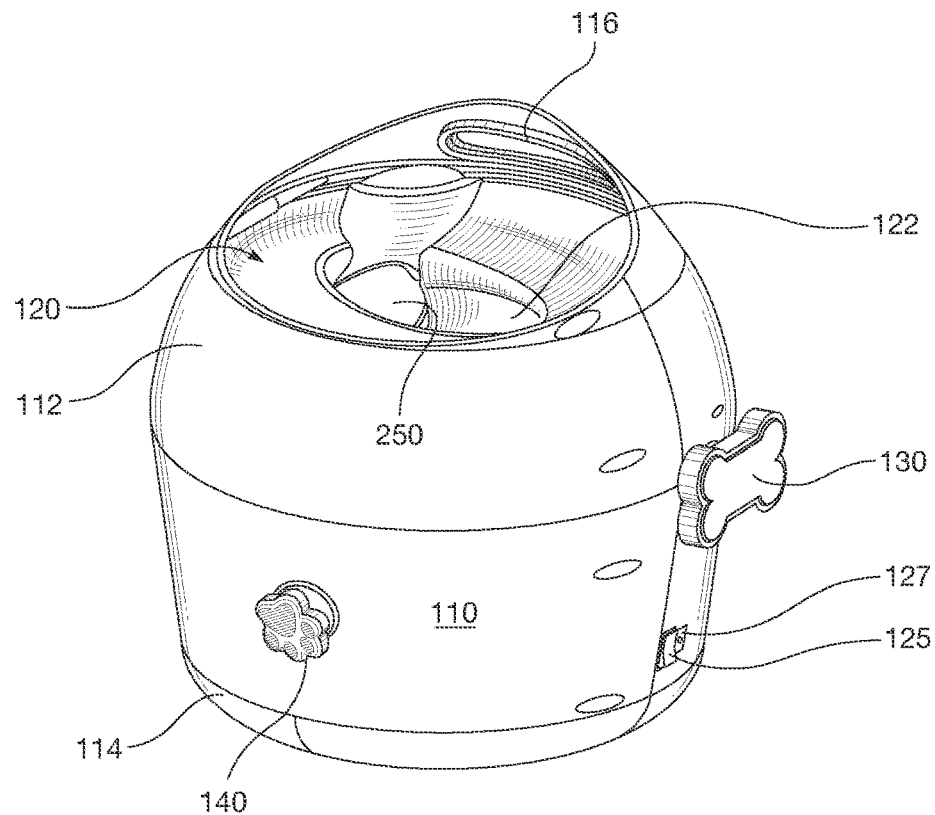
FIG. 2A presents another perspective view of the ball launcher of FIG. 1A, but taken from a rear perspective. A pair of knobs residing external to the housing are visible. These represent an angle adjustment knob and a tension adjustment knob.

FIG. 2A presents another perspective view of the ball launcher 100 of FIG. 1A. Here, the view is taken from a rear of the housing 110. An optional channel 122 is now visible, formed in the funnel 120. The channel 122 directs a ball 150 to a launch point 250 within the housing 110 as the ball 150 gravitationally falls from the funnel 120. The funnel 120 is preferably dimensioned to hold several balls in series.

FIG. 2A also shows two features that are related to providing power to the ball launcher 100. The first feature is a power switch 125. The power switch 125 is preferably a rocker switch designed to provide two basic settings—on and off. The second feature is a female power plug jack 127. The jack 127 serves as a receptacle or AC adapter for receiving the tip of a power cord.

Also of interest, FIG. 2A presents a pair of knobs 130, 140. Each knob 130, 140 resides external to the housing 110 and is configured to be rotated to adjust a setting of the ball launcher 100. The first knob 130 is a tension adjustment knob. As will be described more fully below, the tension adjustment knob 130 allows the pet owner (or toy operator) to adjust the tension of a spring (shown at 420 in the FIG. 4 series of drawings) within the housing 110. This, in turn, allows the pet owner to adjust the distance at which the ball 150 is launched from the toy 100. The second knob is an angle adjustment knob 140. The angle adjustment knob 140 allows the pet owner (or toy operator) to adjust the angle of orientation of a platform (shown at 410 in the FIG. 4 series of drawings) within the housing 110. This, in turn, allows the pet owner to adjust the angle at which the ball 150 is launched through the chute 115.

Figure 2B:
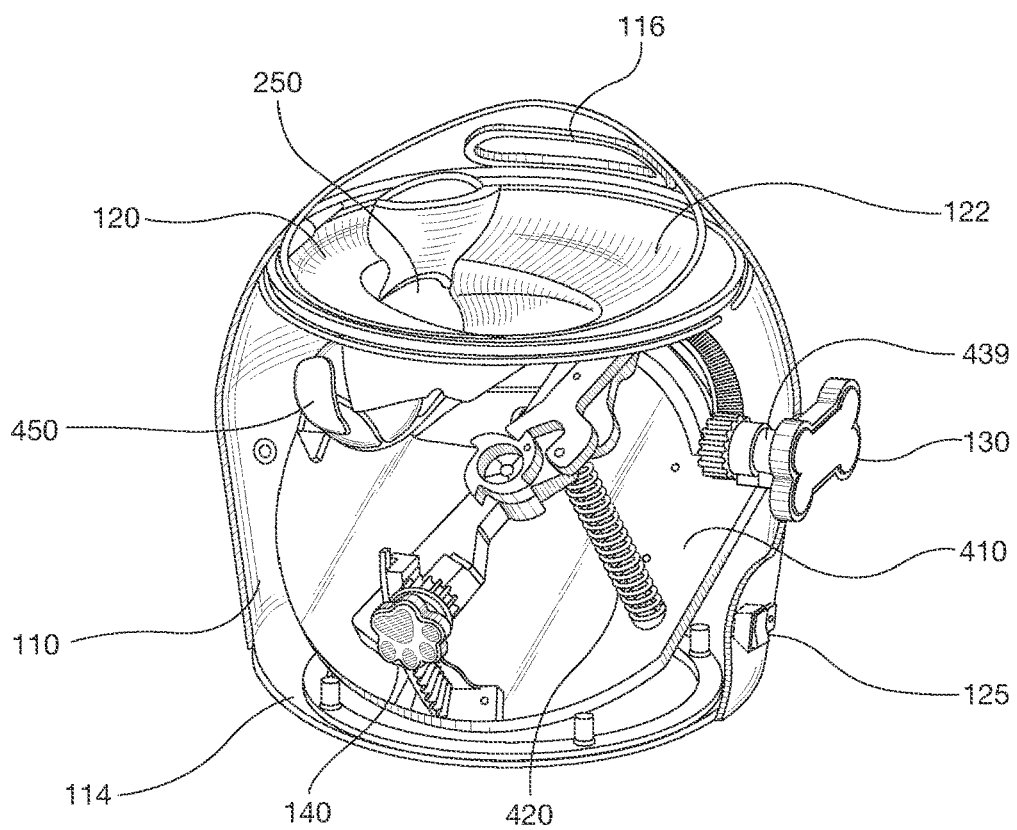
FIG. 2B shows the same perspective view as FIG. 2A; however, the housing is shown in cut-away view, exposing certain components of the automatic ball launcher residing inside of an interior.

FIG. 2B is another perspective view of the automatic ball launcher 100. This shows the same view as in FIG. 2A. The housing 110 is cut away, exposing certain components of the automatic ball launcher 100 residing inside of an interior of the housing 110. The components include the platform 410, the spring 420 and a cup 450 for holding the ball 150 at a launch point 250. These and other components will be described more fully below in connection with the FIG. 4 series of drawings.

Figure 3A:
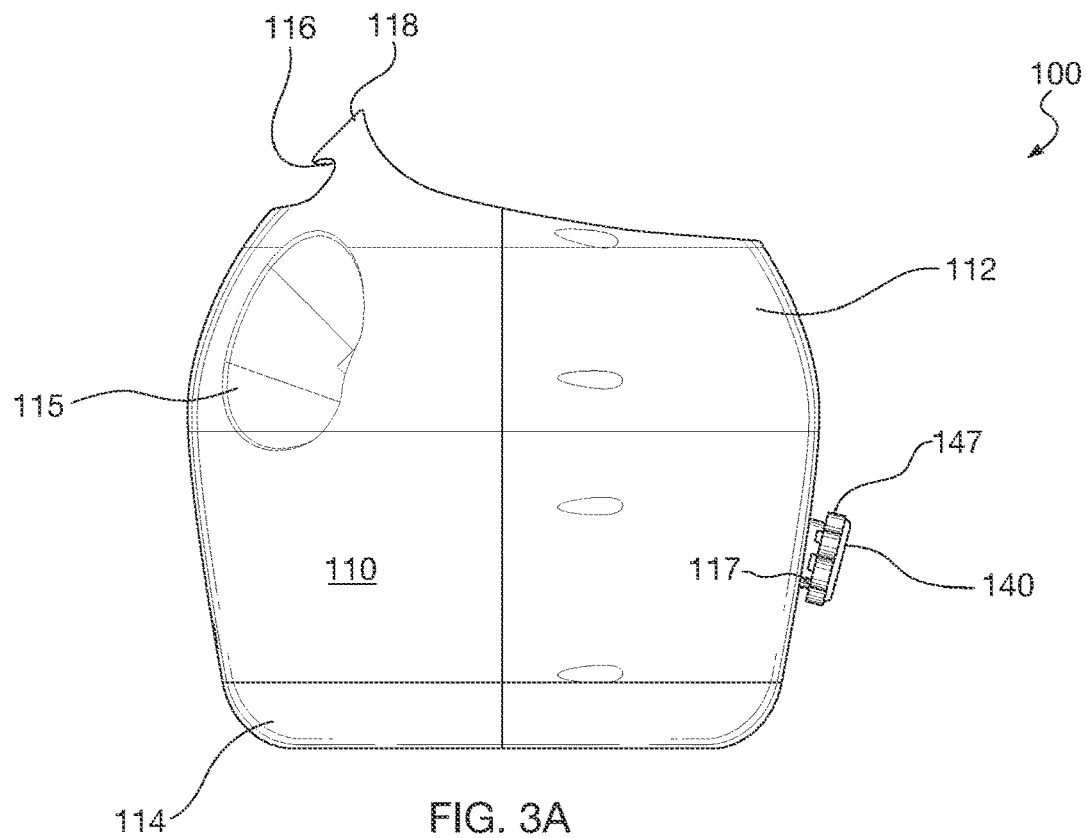
FIG. 3A is a left side elevation view of the ball launcher of FIG. 1A.
Figure 3B:
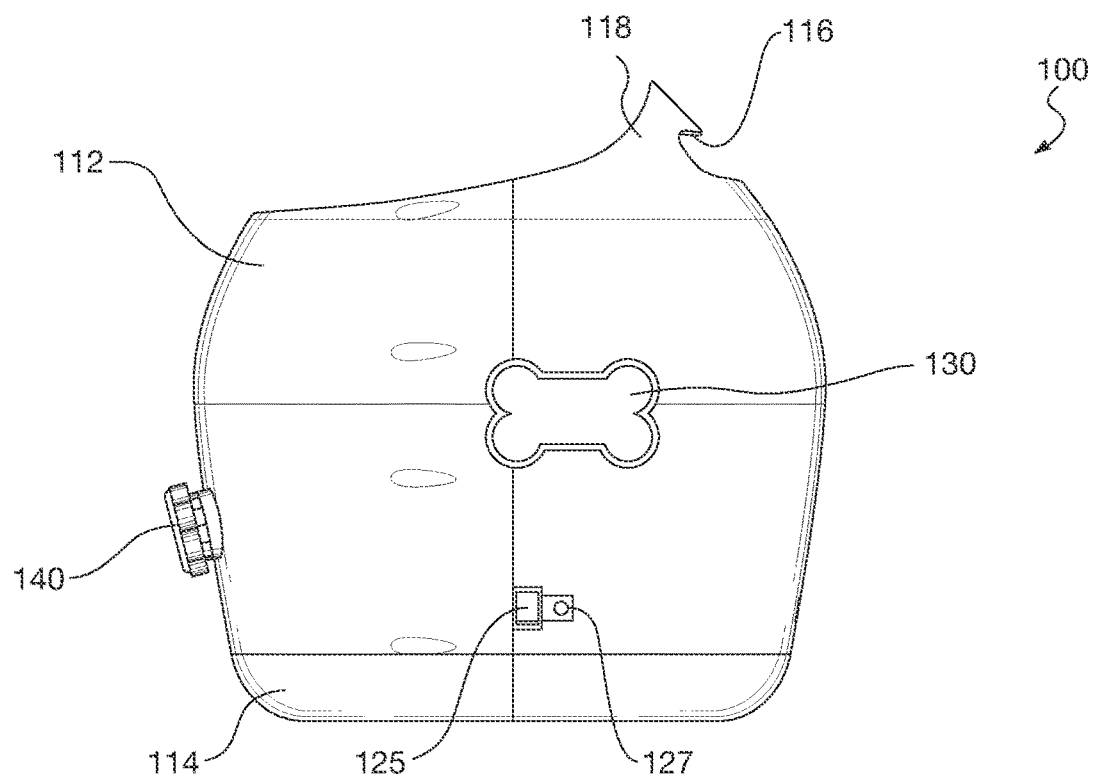
FIG. 3B is a right side elevation view of the ball launcher of FIG. 1A.

FIG. 3A is a left side elevation view of the ball launcher of FIG. 1A. Reciprocally, FIG. 3B is a right side elevation view of the ball launcher of FIG. 1A. Each of these views presents the housing 110 and the handle 116. Each view also shows the angle adjustment knob 140. FIG. 3A shows the chute 115, which defines a through-opening through the housing 110. FIG. 3B shows the tension adjustment knob 130. Beneficially for marketing purposes, the illustrative tension adjustment knob 130 is in the somewhat cartoonish but aesthetically pleasing form of a dog bone.

FIG. 3B provides a better view of the power switch 115 and the power receptacle 127. Of course, the ball launcher 100 may also be powered through one or more batteries, or a battery pack (not shown). The batteries may be, for example, charged through solar energy. In one aspect, six D-cell batteries are used. Alternatively, a small lithium ion battery may be used.

Figure 4A:
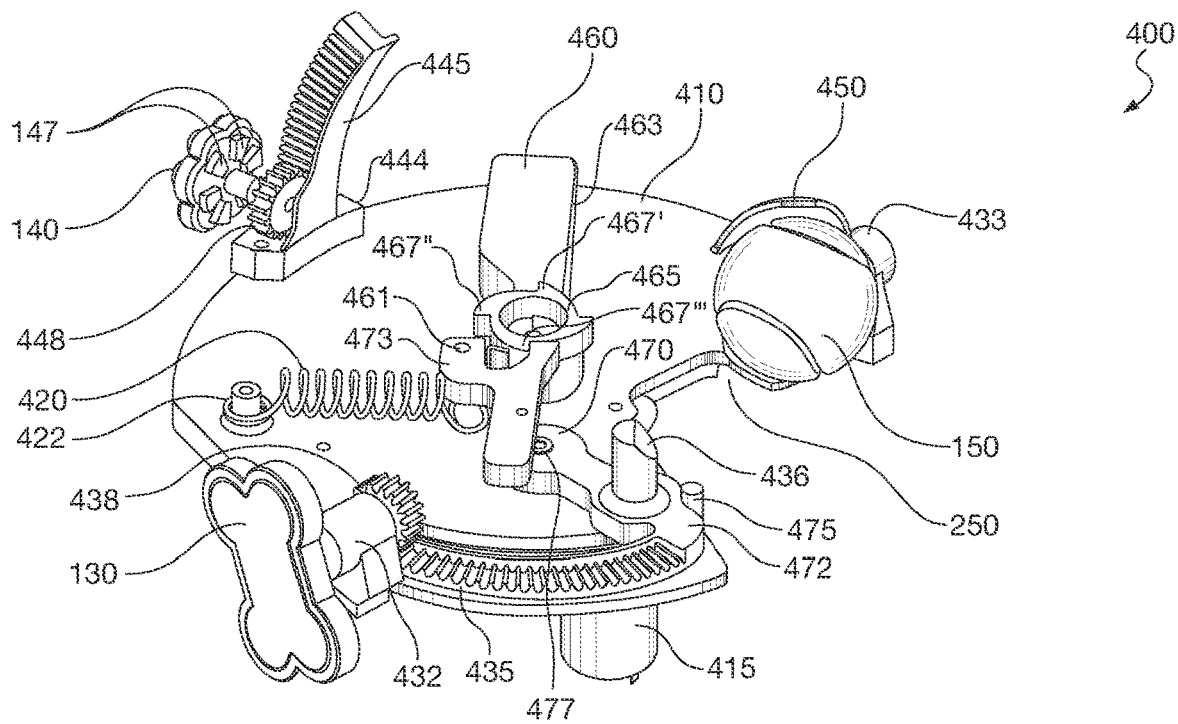
FIGS. 4A through 4D present various perspective views of internal components of the automatic ball launcher, in a selected embodiment.
Figure 4B:
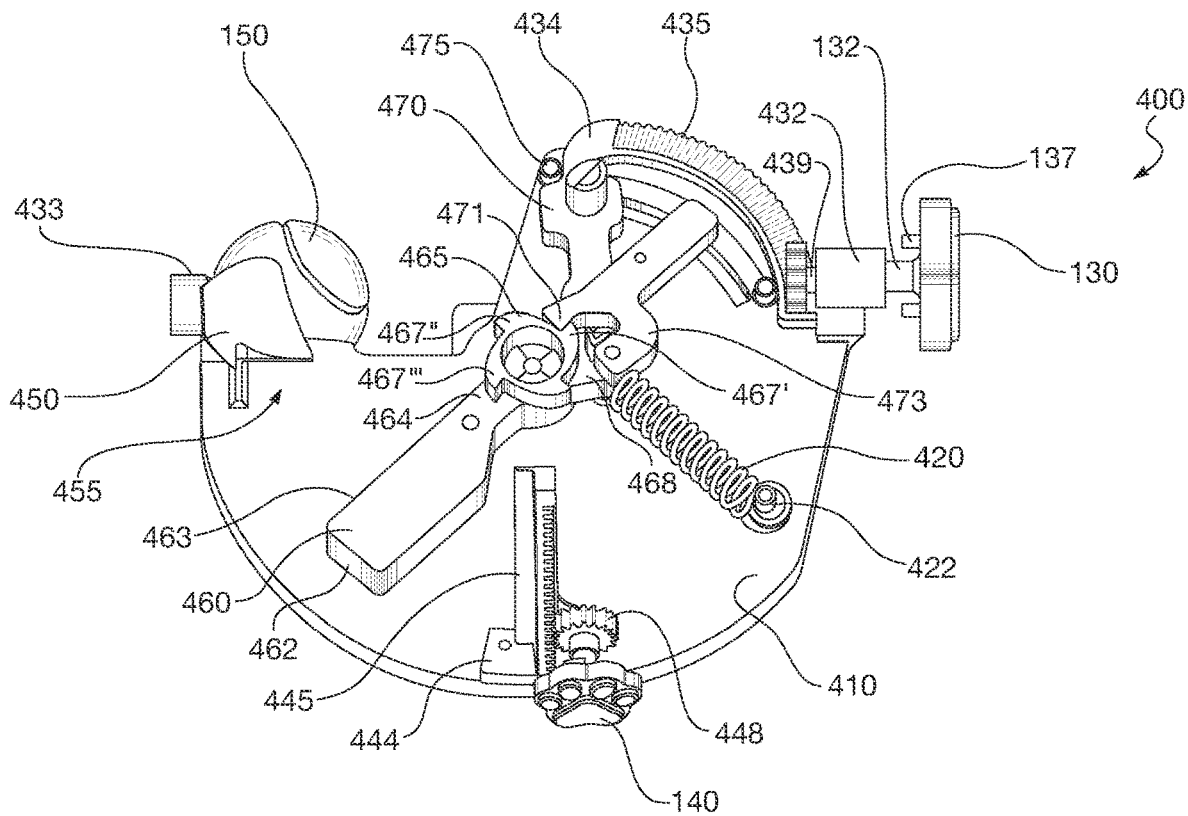

FIGS. 4A through 4D present various perspective views of internal components of the automatic ball launcher 100, in a selected embodiment. FIG. 4A is a front perspective view of the platform 410 of the ball launcher 100, while FIG. 4B is a rear view of the platform 410. The platform 410 is used to support internal components. Beneficially, the platform 410 is designed to pivot along a pair of aligned pivot connection points 432, 433. The pivot connection points 432, 433 represent small cylinders that are supported above the platform 410. In one aspect, the cylinders 432, 433 are supported on the inside face of the housing 110, forming an axis of rotation.

It is understood that the pivot connection points 432, 433 may have other arrangements. For example, the pivot connection points could define pins that extend outward from the perimeter of the platform 410, and that extend through small through-openings in the housing 110. Inversely, the pivot connection points could define short cylinders that extend outward from the perimeter of the platform 410, and that receive short pins (not shown) that extend inwardly from the housing 110.

In each of FIGS. 4A and 4B, a ball 150 is shown along a launch point 250 on the platform 410. The ball 150 is in position to be struck by the elongated hammer 460. It is noted that the cup 450 has a through-opening 455. The through-opening 455 accommodates a striking surface 463 of the hammer 460 as it approaches the ball 150. The striking surface 463 may optionally have raised patterns, or may have an angled hitting face to impart loft to a struck ball 150. Alternatively, the striking surface 463 of the hammer 460 may have removable edges fabricated from different materials that create different launching characteristics of the ball 150 during striking. For example, some interchangeable surfaces 463 may be softer and some may be harder.

As noted above, a biasing force is applied to the hammer 460 in order to cause the hammer 460 to move towards the ball 150. Preferably, the biasing force is applied by a spring 420 that is held in tension. The spring 420 has a proximal end that is secured to the platform 410 at a connection pin 422. At the same time, the spring 420 has a distal end 424 that is operatively secured to a proximal end 464 of the hammer 460. More specifically, the distal end 424 of the spring 420 is connected to a flange 468 of the hammer 460.

Rotation of the proximal end 464 of the hammer 460 away from the connection point 422 of the spring 420 adds tension to the spring 420. A release of that tension causes the striking surface 463 to rapidly rotate towards the ball 150.

To add tension to the spring 460, the automatic ball launcher 100 first includes a drive motor 415. The drive motor 415 preferably resides on an under-surface 412 of the platform 410. The drive motor 415 has a shaft (not visible) that extends up through the platform 410 and connects to a ratchet driver 465. Preferably, the shaft extends up through an opening in the proximal end 464 of the hammer 460, while the ratchet driver 465 resides over the proximal end 464 of the hammer 460. Preferably, the shaft drives the ratchet driver 465 in a counter-clockwise direction. Of interest, the hammer 460 is free to rotate about the shaft in either direction, not being mechanically coupled to the shaft itself.

It is understood that the drive motor 415 will include a gear box that houses the shaft and appropriate electrical wiring. The gear box is affixed to the underside of the platform 410. The gear box may also house a microprocessor or circuitry having firmware. The micro-processor or circuitry is arranged to communicate with a sensor (not shown) that senses the presence of a ball 150 at the launch point 250. When the sensor senses a ball 150, a switch sends a signal to initiate rotation of the shaft for a pre-designated period of time, such as 5 to 10 seconds.

The ratchet driver 465 includes a plurality of teeth 467. In the arrangement of FIGS. 4A and 4B, the ratchet driver 465 has four teeth 467 equi-radially spaced around the ratchet driver 465.

The automatic ball launcher 100 also includes a spring adjustment arm 470. The spring adjustment arm 470 is pivotally connected to the platform 410 through a pin 477. The spring adjustment arm 470 has a proximal end 472 that resides along the platform 410. The proximal end 472 includes a "striking" post 436, which serves as a rotational stop member of trigger release arm 474 in one direction. The proximal end 472 abuts a post 475, which serves as a rotational stop member of a tensioning gear track 435 in one direction.

The automatic ball launcher 100 further includes the trigger release arm 474. A distal end of the trigger release arm 474 includes a pair of pawls 471, 473. A first pawl 471 is configured to catch a ratchet tooth 467 as the ratchet driver 465 is rotated. A second pawl 473 is pivotally connected to the flange 468 at the proximal end 464 of the hammer 460 by means of pin 461. In this way, the trigger release arm 474 moves with the proximal end 464 of the hammer 460.

The shaft of the drive motor 415, the hammer 460, the ratchet driver 465, and the trigger release arm 474 essentially rotate together to place tension on the spring 420. The pawl 471 is held into contact with the ratchet tooth 467' where the spring 420 is mounted between the proximal end 464 of the hammer 460 and the trigger release arm 474.

As noted, the spring adjustment arm 470 includes a strike post 436. The location of the post 436 along the platform is adjusted by using the tension adjustment knob 130, described more fully below. Rotation of the tension adjustment knob 130 moves the location of the post 436 of the spring adjustment arm 470, giving input to the trigger release arm 474 at the point where the pawl 471 is to release the ratchet tooth 467'.

As the drive motor 415 turns the ratchet driver 465 counter-clockwise, the distal end of the trigger release arm 474 is carried with it. This adds tension to the spring 420. The proximal and of the trigger release arm 474 will eventually engage the strike post 436. This, in turn, will cause the trigger release arm 474 to pivot about pin 477, causing the pawl 471 to release the ratchet tooth 467'. Upon release, the hitting arm 460 rapidly rotates the other direction (clockwise) to hit the ball 150, causing the ball 150 to quickly travel (or be launched) through the chute 115.

It is observed that the ratchet driver 465 preferably has four teeth 467. The multi-tooth arrangement gives the launcher 100 a quicker tension time versus an alternate design, as the spring 420 can be given tension in a smaller angle, that is, on the order of 90° rather than a full 360°. In addition, the adjustable release location of the trigger release arm 470 allows for varying spring tension releases, which will vary the force in which the ball 150 is hit.

In operation, as the ratchet driver 465 is rotated, a first tooth 467' on the ratchet driver 465 engages the first pawl 471 of the trigger release arm 474. This causes the trigger release arm 474 to begin pivoting with the ratchet driver 465. The second pawl 473, which is operatively connected to the distal end 424 of the spring 420 through pin 461, moves with the first pawl 471, loading the spring 420 in the process. In a preferred embodiment, the second pawl 473 is pivotally connected to the flange 468 at the proximal end 464 of the hammer 460, also by means of the pin 461. Optionally, a second opposing tooth 467" will engage a hook (not shown) along the hammer 460 to cause the flange 466 at the proximal end 464 of the hammer 460 to move with the rotating ratchet driver 465. In either instance, the distal end 462 of the hammer 460 moves away from the ball 150.

The counter-clockwise rotation of the shaft indirectly turns the hammer 460 counter-clockwise while the ratchet tooth 467' is engaged on the first pawl 471 of the trigger release arm 474. Rotation of the shaft adds tension to the spring 420, which in turn is attached to the hammer 460. As the ratchet driver 465 continues to rotate, the first tooth 467' will eventually pull away from the first pawl 471, induced by a proximal end of the trigger release arm 474 contacting the post 436. The distal end 462 of the hammer 460 will be released from the tooth 467' and will rapidly rotate back towards the ball 150 under the force of the recoiling spring 420. This means that the hammer 460 will rotate clockwise from the spring tension. The striking surface 463 will pass through the through-opening 455, striking the ball 150 and causing the ball 150 to be launched through the chute 115. A dog may then pursue or "fetch" the ball 150. The driver motor 415 may immediately stop, or may continue to rotate the shaft for a designated period of time until a next ratchet tooth 467″ or 467‴ engages the pawl 471. The drive shaft will then stop rotating the ratchet driver 465 until a new ball is sensed by the switch at the launch point 250.

It is noted that the ratchet teeth 467 on the ratchet driver 465 could vary in number from one to more than one, until the number was so great it would become unfeasible. Less teeth makes the reload time longer because the shaft must turn far enough to pull tension on the spring. If only one tooth is on the ratchet wheel, the shaft must turn 360° to reload the max tension on the spring 420. Where the ratchet driver 465 has four teeth 467, it need only turn 90° to reload the max tension on the spring 420.

Preferably, a motion sensor is positioned along a front side of the housing 110. If the motion sensor senses the presence of a person or dog near the chute 115, the drive motor 415 is immediately cut off. This prevents the hammer 420 from striking a ball 150.

In one embodiment, the ball launcher 100 of the present invention allows the operator to indirectly adjust the spring 420 tension. This, in turn, allows the operator to modify the distance at which the ball 150 is launched from the chute 115. To implement this feature, the ball launcher 100 includes a tension adjustment knob 130. The tension adjustment knob 130 is used to turn a tensioning gear 438.

Figure 4C:
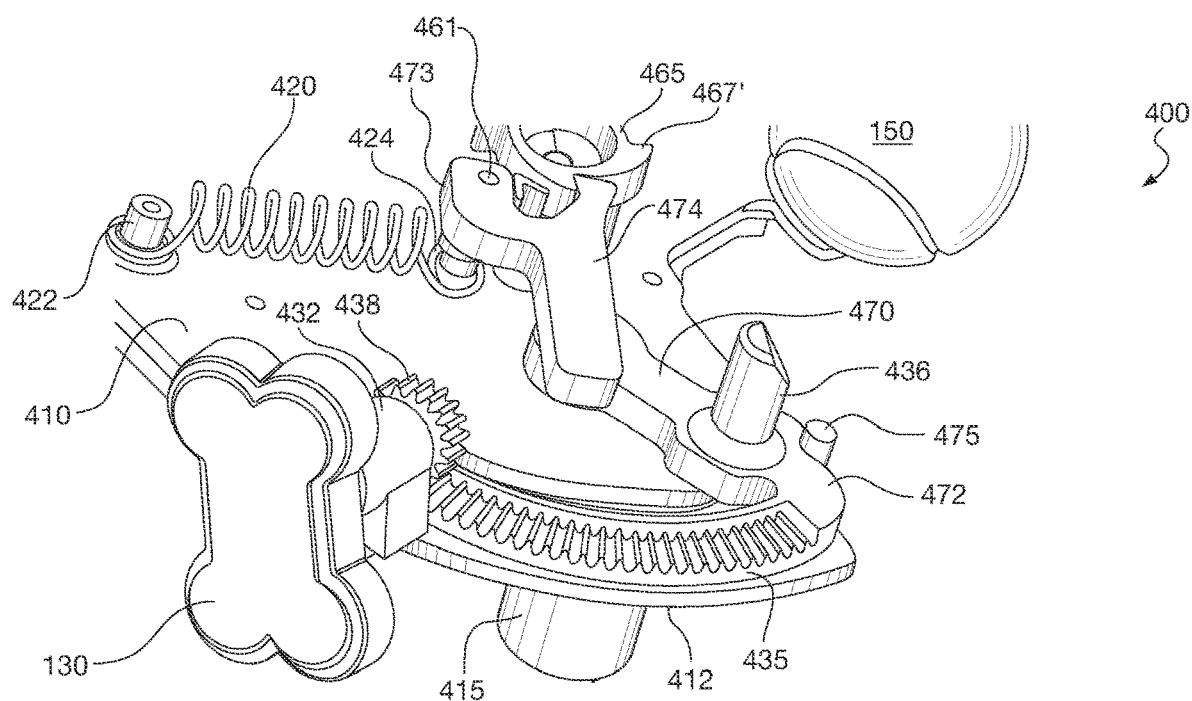

FIG. 4C is an enlarged perspective view of the platform of FIG. 4A. The tension adjustment knob 130 and the connected tensioning gear 438 are more clearly seen. The tensioning gear 438 is connected to the tensioning knob 130 by means of a shaft 432. Rotation of the knob 130 causes the shaft 432 and connected tensioning gear 438 to move a horizontally oriented tensioning gear track 435. This, in turn, moves the spring adjustment arm 470, which adjusts the location of the strike post 436, which ultimately moves the point at which the first tooth 467′ of the ratchet driver 465 releases the first pawl 471. The effect is to change the amount of tension applied to the spring 420 before the hammer 460 is released to strike a ball 150.

It is observed that vibrations generated by the drive motor may cause the position of the tensioning gear track 435 to incidentally move. To prevent this unintentional movement and to hold the position of the tensioning knob 130 along the housing 110, an optional locking mechanism may be provided. In the view of FIGS. 1B and 4B, pins 137 are placed under the knob 130. The pins 137 mate with saw teeth 117 in the housing 110. The mated pins 137 and saw teeth 117 hold the knob 130 and operatively connected tensioning gear 438 in place, preventing rotation. This, in turn, prevents movement of the tensioning gear track 435.

It is again observed that a post 475 is provided along the platform 410. The post 475 is a fixed object that prevents movement of the tensioning gear track 435 into the chute 115, where it might interfere with launching of a ball 150. This also acts as a maximum spring tension stop.

The knob 130 is further secured relative to the housing 110 by means of a compression spring 439. The compression spring 439 resides along and is connected to the shaft 132. The compression spring 439 biases the knob 130 into the housing 110 so that the pins 137 stayed locked into the saw teeth 117. To release the pins 137 from the saw teeth 117, the operator pulls on the knob 130, overcoming the inward biasing force of the spring 439 and releasing the pins 137 from the saw teeth 117.

In another aspect, the ball launcher 100 of the present invention allows the operator to adjust the angle of the platform 410 relative to the housing 110. This, in turn, allows the operator to adjust the angle at which the ball 150 is launched from the chute 115. To implement this feature, the ball launcher 100 includes an angle adjustment knob 140. The angle adjustment knob 140 is used to turn an angle gear 448.

Figure 4D:
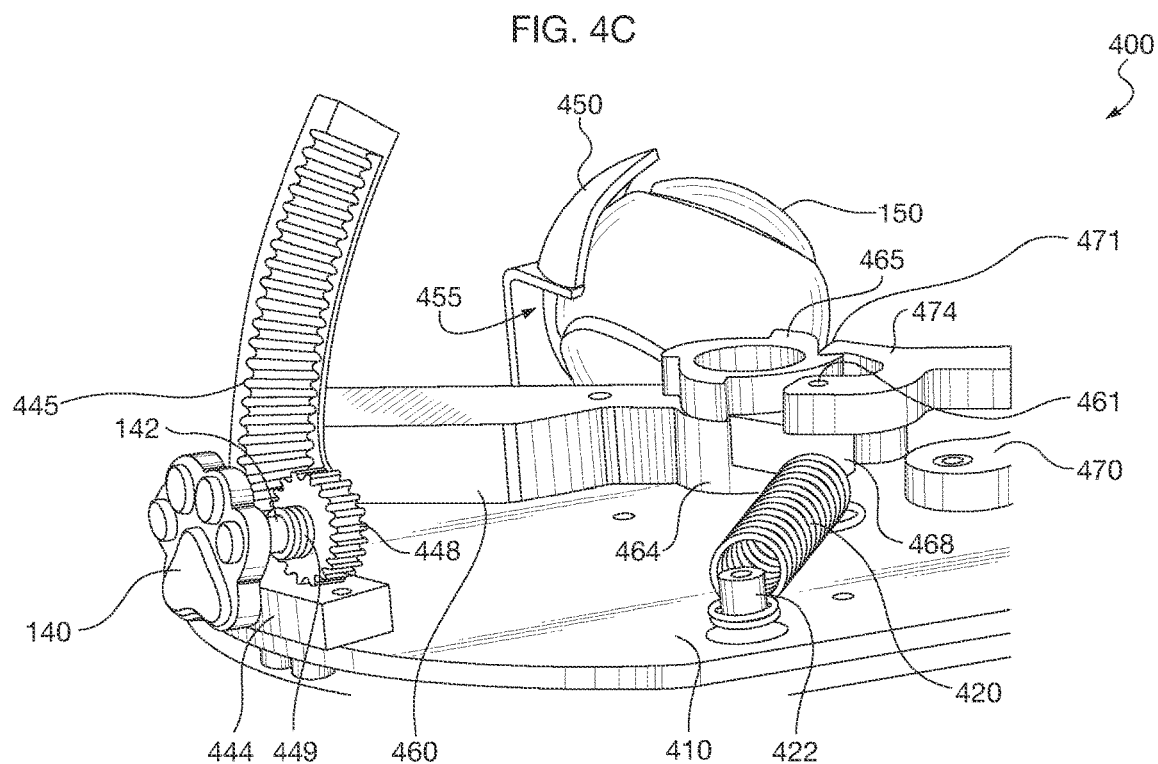

FIG. 4D is another enlarged perspective view of the platform 410 of FIG. 4A. The angle adjustment knob 140 and connected angle gear 448 are more clearly seen. The angle gear 448 is connected to the angle adjustment knob 140 by means of a shaft 142. Rotation of the knob 140 causes the shaft 142 and connected angle gear 448 to move a vertically oriented angle gear track 445.

The angle gear track 445 is secured to the platform 410 by means of a base plate 444. The base plate 444 is connected to the platform 410. In this way, as the angle gear track 445 is moved up or down, the platform 410 pivots about the axis of rotation defined by the pivot connections 432, 433. This, in turn, changes the angle at which the hammer 460 rotates to strike the ball 150. The ultimate effect is to change the angle at which the ball 150 is launched from the chute 115.

It is observed that vibrations generated by the drive motor may cause the position of the angle gear track 445 to move. To prevent this movement and to hold the position of the angle adjustment knob 140 along the housing 110, an optional locking mechanism may be provided. In the view of FIG. 4A, pins 147 are placed under the knob 130. The pins mate with saw teeth 117 in the housing 115. The mated pins 137 and saw teeth 117 hold the knob 140 and operatively connected angle gear 448 in place, preventing rotation. This, in turn, prevents movement of the angle gear track 445.

The knob 140 is further secured relative to the housing 110 by means of a compression spring 449. The compression spring 449 resides along and is connected to the shaft 142. The compression spring 449 biases the knob 140 into the housing 110 so that the pins 147 stay locked into the saw teeth 117 To release the pins 147 from the saw teeth 117 the operator pulls on the knob 130, overcoming the inward biasing force of the compression spring 449 and releasing the pins 137 from the saw teeth 117

In an alternate embodiment, adjustment of the angle of the platform 410 relative to the housing 110 is done, not by turning a knob and moving a gear, but by sliding the knob 140 along a vertical track (not shown).

As can be seen, a novel ball launching apparatus is offered herein. The ball launching apparatus allows a dog to fetch a ball and then return the ball by placing it into a funnel at the top of the apparatus, wherein the ball falls into a launch point within a housing of the apparatus. As long as power is on, the ball launcher senses the presence of the ball and then re-launches it. Beneficially, the ball launching apparatus does not rely upon fly wheels or a solenoid for launching the ball. Further, the apparatus enables the operator to both adjust the distance at which the ball is launched, and the angle at which the apparatus launches the ball through a chute.

In a preferred embodiment, the novel ball launcher 100 is configured to store tension in a spring. The stored tension is released, allowing a hammer to rotate into a waiting ball. The motor will turn the hammer one rotation direction and a trigger release arm (or "release lever") will allow the hammer to move in the other rotational direction while using the spring tension.

The hammer is part of a hitting arm assembly. The hitting arm assembly consists of several components working together on the output shaft of a gearbox. The hitting arm employs a hammer that is free to rotate either direction, not being mechanically coupled to the shaft. The shaft is keyed to a ratchet driver (or "ratchet teeth star wheel) and is driven by the gearbox in one direction. The star wheel has four ratchet teeth. The ratchet teeth contact the release lever arm and lock the assembly for rotation.

The entire hitting arm assembly rotates to place tension on the spring. The release lever arm is held into contact with the ratchet tooth with a spring mounted between the release lever and the hitting arm. An adjustable release location for the lever arm allows for varying spring tension releases, which will vary the force in which the ball is hit. This will allow for short, medium or long distance launches from the device, also to match the environment specific needs. The hammer rotates the other direction to hit the ball, causing it to exit the device.

The entire internal assembly of the hitting arm, motor and gearbox is angle adjustable by the user. This allows for balls to be launched at different angles for environment-specific needs. If a user wishes to use the launcher indoors, they may choose a low angle (and less spring tension) for indoor play. If the user wishes to use the launcher outdoors, they have the option to adjust to a high angle for maximum launch distance. In one aspect, a facing along the strike surface of the hammer may be replaced or changed out to adjust the distance at which the ball is launched through the chute.

The ball launching device includes a sensor which will prohibit the launch sequence if an object is in the path of the launching ball near the unit. The device will have an on/off switch. The device includes a sensor to detect when a ball is presented for launch. The device will be shaped to allow a pet to drop a ball into the loading area, with a funnel effect. The ball will gravity feed into the waiting area for launch.

One ball in play at a time will be the preferred mode of operation. When the pet drops the ball into the load area, the ball will roll into the launch point. The sensor will detect the ball, and another sensor will ensure no object is in front of the chute, and the device will activate launch sequence. The ball will then be launched for the pet. The pet will capture the ball and bring it back to the load area.

In one aspect, the ball launching apparatus is driven by software, which provides for a cool down period for pets which do not rest. The device will not operate for a preset cool down period. After the cool down period is over, the unit will alert the pet with a tone, or series of tones. The unit will then launch the ball and play will resume.

A method of exercising a dog is also provided herein. In one aspect, the method first includes providing a ball launching apparatus. The ball launching apparatus is configured in accordance with the apparatus 100 described above in its various embodiments.

The method also includes providing a ball to a dog. Preferably, the ball is a standard tennis ball having an outer diameter of between about 2.5 and 2.7 inches. However, the ball launching apparatus is configured to accommodate both a standard-sized tennis ball and a ball that is up to 5 percent larger than 2.5 inches or 40 percent smaller than 2.7 inches in outer diameter.

The method also comprises training the dog to place the ball into the funnel. The switch will sense the presence of the ball once it falls into the launch point. The motor is actuated and the hammer strikes the ball, sending the ball through the chute. The dog then chases (or "fetches") the ball, and returns it to the funnel once again. In this way, the dog is self-entertained and exercised.

The method may optionally include adjusting a tension in the spring, thereby ultimately adjusting the distance in which the ball travels when struck. This may be done by turning a tensioning knob residing external to the housing to move a gear along a horizontally-oriented tensioning gear track residing inside of the housing. The method may also optionally include adjusting an angle of the platform relative to the base. This has the effect of changing the angle at which the ball is released from the chute. This may be done by turning an angle adjustment knob residing external to the housing to move a gear along a vertically-oriented angle adjustment gear track residing inside of the housing.

An advantage of the design provided herein is that there is no power drain on the batteries after the ball is launched. There is not a need to maintain power to a fly wheel, for instance, between launches. Another advantage of the design is the fact that the slight pre-tension on the spring allows the hitting arm to be positioned out of the way of the ball launch point. Yet another advantage is that the angle position of the spring mount can be modified to allow for more force to be applied to the ball, at the expense of the arm position in the pre-launch position.

Variations of the ball launching apparatus and of the method for exercising a dog may fall within the spirit of the claims, below. It will be appreciated that the inventions are susceptible to modification, variation and change without departing from the spirit thereof.

I claim:

1. A ball launching apparatus, comprising:
a housing having a supporting base and an interior compartment;
a funnel at an upper end of the housing, the funnel being configured to gravitationally direct a ball into a launch point within the interior compartment;
a chute adjacent the launch point defining a through-opening along the housing;
a platform within the interior compartment, wherein an angle of the platform is adjustable relative to the base;
a drive motor configured to rotate a shaft within the interior compartment;
an elongated hammer residing along the platform, the hammer comprising a proximal end, a distal end, and a through-opening for receiving the shaft; and wherein:
the distal end of the hammer defines a ball striking surface, with the distal end being biased toward the launch point,
the ball launching apparatus is configured such that rotation of the shaft for a period of time causes rotation of the distal end of the hammer away from the launch point, whereupon the hammer is released to allow a biasing force to counter-rotate the distal end of the hammer back towards the launch point, thereby striking the ball and launching the ball through the chute,
a spring residing along the platform is maintained in tension to provide the biasing force, and
a tension adjustment knob resides external to the housing, wherein the rotation of the tension adjustment knob adjusts the period of time, wherein the adjusting the period of time comprises adjusting the tension maintained on the spring to provide the biasing force.

* * * * *